US009160877B2

(12) United States Patent
Goshima (10) Patent No.: US 9,160,877 B2
(45) Date of Patent: Oct. 13, 2015

(54) SHORT-TIME ACTIVATED IMAGE FORMING APPARATUS, ACTIVATION CONTROL METHOD, AND NON-TRANSITORY COMPUTER-READABLE RECORDING MEDIUM (71) Applicant: Kyocera Document Solutions Inc., Osaka (JP)

(72) Inventor: Satoshi Goshima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/278,376

(22) Filed: May 15, 2014

(65) Prior Publication Data

US 2014/0340708 A1    Nov. 20, 2014

(30) Foreign Application Priority Data

May 15, 2013   (JP) .................................. 2013-102753

(51) Int. Cl.
*G06F 3/12*   (2006.01)
*H04N 1/00*   (2006.01)

(52) U.S. Cl.
CPC ................................ *H04N 1/00962* (2013.01)

(58) Field of Classification Search
None
See application file for complete search history.

(56) References Cited

U.S. PATENT DOCUMENTS 8,180,993 B2 * 5/2012 Hama ........................... 711/173
2012/0327473 A1 * 12/2012 Ito .................................. 358/1.16
2013/0250336 A1 * 9/2013 Takatani ....................... 358/1.13

FOREIGN PATENT DOCUMENTS

JP   2008-099013 A   4/2008

* cited by examiner

*Primary Examiner* — Paul F Payer
(74) *Attorney, Agent, or Firm* — James W. Judge (57) ABSTRACT

An image forming apparatus includes a main control unit, a sub control unit, a main storage unit, an auxiliary storage unit, an auxiliary storage load unit, a load-program storage unit, and an external storage load unit. The auxiliary storage load unit is configured to load each of a program to be executed by the main control unit and a program to be executed by the sub control unit stored in the auxiliary storage unit from the auxiliary storage unit to the main storage unit at first activation. The external storage load unit is configured to load the program stored in the external storage medium by the load-program storage unit to the main storage unit at a subsequent activation concurrently with loading the program to be executed by the main control unit from the auxiliary storage unit by the auxiliary storage load unit.

15 Claims, 9 Drawing Sheets

SHORT-TIME ACTIVATED IMAGE FORMING APPARATUS, ACTIVATION CONTROL METHOD, AND NON-TRANSITORY COMPUTER-READABLE RECORDING MEDIUM

CROSS-REFERENCE TO RELATED APPLICATION

This application is based upon, and claims the benefit of priority from, corresponding Japanese Patent Application No. 2013-102753 filed in the Japan Patent Office on May 15, 2013, the entire contents of which are incorporated herein by reference.

BACKGROUND

Unless otherwise indicated herein, the description in this section is not prior art to the claims in this application and is not admitted to be prior art by inclusion in this section.

A typical image forming apparatus, such as a copier and a Multi-Functional Peripheral (MFP), includes a control unit, such as a plurality of Central Processing Unit (CPU), and causes respective CPUs to execute different processes.

The typical image forming apparatus having a plurality of CPUs loads a program stored in a Hard Disk Drive (HDD) or a nonvolatile memory onto a memory, and operates by executing the program. In this respect, the plurality of CPUs expand one specific CPU program by a section unit. As a result, when attempting to activate only a specific CPU program quickly, the program may be quickly activated by having aid from other CPU, providing the CPU an effect of preventing occurrence of idle time.

SUMMARY

An image forming apparatus according to an embodiment of the present disclosure includes a main control unit, a sub control unit, a main storage unit, an auxiliary storage unit, an auxiliary storage load unit, a load-program storage unit, and an external storage load unit. The auxiliary storage load unit is configured to load each of a program to be executed by the main control unit and a program to be executed by the sub control unit stored in the auxiliary storage unit from the auxiliary storage unit to the main storage unit at first activation. The load-program storage unit is configured to store a program to be executed by the sub control unit stored in a specified storage unit to an external storage medium connected to the image forming apparatus. The external storage load unit is configured to load the program stored in the external storage medium by the load-program storage unit to the main storage unit at a subsequent activation concurrently with loading the program to be executed by the main control unit from the auxiliary storage unit by the auxiliary storage load unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Image Forming Apparatus 1 According to Embodiment

Figure 1:
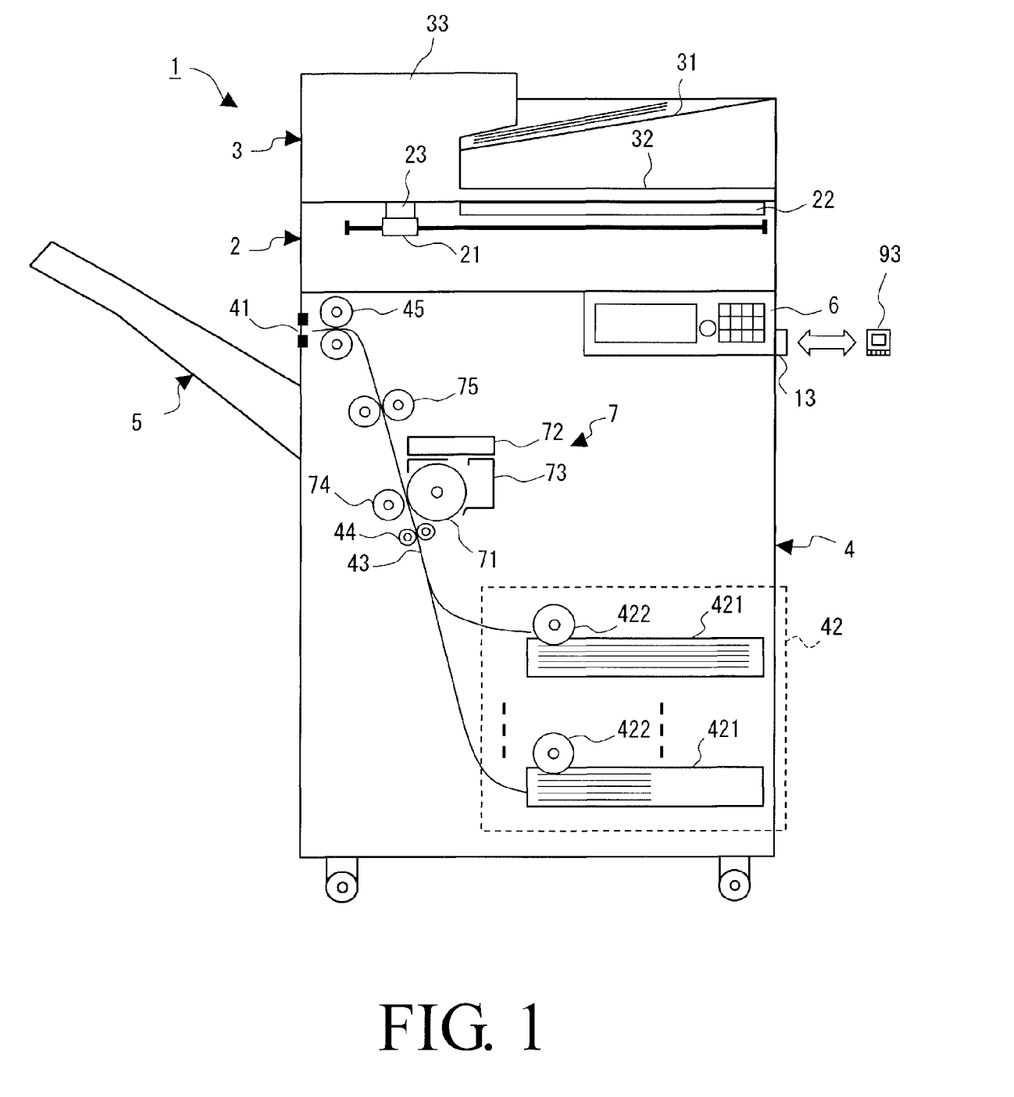
FIG. 1 is a schematic diagram illustrating an internal configuration of an image forming apparatus according to an embodiment of the disclosure.

The configuration of the image forming apparatus 1 (an information processor) according to the embodiment of the disclosure will be described by referring to FIG. 1 to FIG. 2. The image forming apparatus 1 of this embodiment includes a document reading unit 2, a document feeding unit 3, a main unit 4, a stack tray 5, and an operation panel unit 6. The document reading unit 2 is placed on the top of the main unit 4, and the document feeding unit 3 is placed on the top of the document reading unit 2. The stack tray 5 is placed on a discharge port 41 side for recording sheet formed on the main unit 4, and the operation panel unit 6 is placed on the front side of the image forming apparatus 1.

The document reading unit 2 includes a scanner 21, a platen glass 22, and a document reading slit 23. The scanner 21 is constituted of an exposing lamp, Charge Coupled Device (CCD) and Complementary Metal Oxide Semiconductor (CMOS) imaging sensors, and a similar component. The scanner 21 is configured to be movable to the document conveyance direction by the document feeding unit 3. The platen glass 22 is a document platen that is constituted of transparent materials, such as glass. The document reading slit 23 includes a slit that is formed in a direction perpendicular to a document conveyance direction by the document feeding unit 3.

To read a document placed on the platen glass 22, the scanner 21 is moved to a position opposed to the platen glass 22, reads the document placed on the platen glass 22 while scanning it to obtain image data, and then outputs the obtained image data to the main unit 4. To read a document fed by the document feeding unit 3, the scanner 21 is moved to a position opposed to the document reading slit 23, reads the document in synchronization with a document conveying operation by the document feeding unit 3 via the document reading slit 23 to obtain image data, and then outputs the obtained image data to the main unit 4.

The document feeding unit 3 includes a document platen 31, a document discharging unit 32, and a document conveying mechanism 33. A document placed on the document platen 31 is individually fed in sequence by the document conveying mechanism 33, is conveyed to a position opposed to the document reading slit 23, and then is discharged to the document discharging unit 32. Note that the document feeding unit 3 is configured to be a collapsible; the top of the platen glass 22 can be opened by lifting the document feeding unit 3 upward.

The main unit 4 includes an image forming unit 7 as well as a paper sheet feeder 42, a paper sheet conveyance passage 43, a conveyance roller 44, and a discharge roller 45. The paper sheet feeder 42 includes a plurality of sheet feed cassettes 421, which stores different size or different direction of respective recording sheets, and a paper feed roller 422, which feeds a recording sheet one by one from the sheet feed cassette 421 to the paper sheet conveyance passage 43. The paper feed roller 422, the conveyance roller 44, and the discharge roller 45 serve as a conveying unit. Recording sheets are conveyed by this conveying unit. The recording sheet conveyed to the paper sheet conveyance passage 43 by the paper feed roller 422 is fed to the image forming unit 7 by the conveyance roller 44. The recording sheet on which recording is performed by the image forming unit 7 is discharged to the stack tray 5 by the discharge roller 45.

The operation panel unit 6 includes a display unit such as a liquid crystal and an organic electroluminescent display, and buttons including a numerical keypad. The operation panel unit 6 obtains an instruction from a user and then sends it to a main control unit 81. The operation panel unit 6 may also obtain settings such as whether to perform process to speed up the activation time or not (hereinafter called "high-speed activation"). The operation panel unit 6 may also obtain settings such as whether to use an external storage medium 93 for high-speed activation or not.

The image forming unit 7 includes a photoreceptor drum 71, an exposing unit 72, a developing unit 73, a transfer unit 74, and a fixing unit 75. The exposing unit 72 is an optical unit that includes a laser device, an LED array, a mirror, a lens, or a similar unit. The exposing unit 72 forms an electrostatic latent image on the surface of the photoreceptor drum 71 by emitting, for example, light in accordance with the image data and exposing the photoreceptor drum 71. The developing unit 73 is a developing unit that develops an electrostatic latent image formed on the photoreceptor drum 71 using toner, and forms a toner image on the photoreceptor drum 71 in accordance with the electrostatic latent image. The transfer unit 74 transfers a toner image formed on the photoreceptor drum 71 by the developing unit 73 to the recording sheet. The fixing unit 75 performs recording by fixing toner image on the paper sheet by heating the paper sheet where the toner image is transferred by the transfer unit 74.

A storage medium connection unit 13 is a device that includes a terminal, a connector and an interface circuit connected to the external storage medium 93. When the storage medium connection unit 13 is connected to the external storage medium 93, the external storage medium 93 is read and written using various standards, such as USB, PCI Express, and SATA. The storage medium connection unit 13 may include a physical layer circuit, which controls an access with the external storage medium 93, and an interface, which controls communication. The external storage medium 93, which is connected to the storage medium connection unit 13, serves mainly as a nonvolatile storage unit, like an auxiliary storage unit 92 (see FIG. 2). The example in FIG. 1 illustrates that the storage medium connection unit 13 is a reader/writer of a flash memory card exposed to the outside of the image forming apparatus 1. However, the storage medium connection unit 13 may be a slot of SD card, a connector of a Mini PCI Express card, or a SATA connector, which are fixed and mounted on the internal base of the image forming apparatus 1. In other words, unless the case is opened, the external storage medium 93 may be configured to so as not to be removed easily by ordinary users. Note that the storage medium connection unit 13 may be connected to the external storage medium 93 or various devices by a wireless connection or an optical connection.

The external storage medium 93 is a device, which is equipped with a storage medium, such as various flash memory cards including SD card, xD memory card, and a memory stick; USB memory card; Solid State Drive (SDD); a HDD; a smartphone; a tablet device; a PDA; a digital camera and a video camera; and/or a Radio Frequency IDentification (RFID) card. The external storage medium 93 may be used for high-speed activation as described below. Note that the external storage medium 93 may store a file such as a document and an image, in addition to data for high-speed activation.

Control Configuration of the Image Forming Apparatus 1

Figure 2:
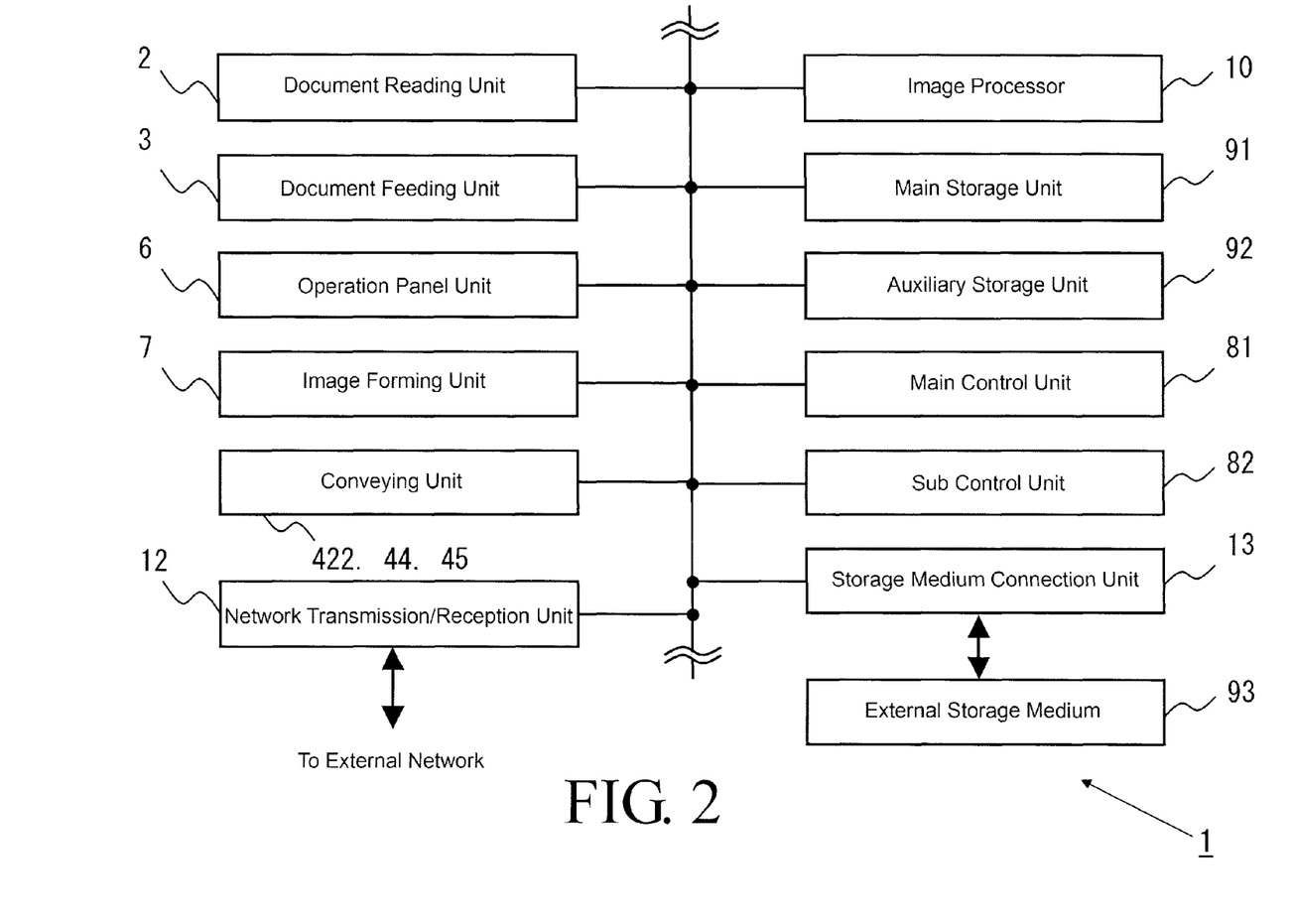
FIG. 2 is a schematic diagram illustrating a block configuration of the image forming apparatus.

FIG. 2 illustrates the schematic control configuration of the image forming apparatus 1. The document reading unit 2, the document feeding unit 3, the conveying units (the paper feed roller 422, the conveyance roller 44, the discharge roller 45), the operation panel unit 6, the image forming unit 7, an image processor 10 (an image processor), a network transmission/reception unit 12, the main control unit 81 (a control unit), a sub control unit 82 (a control unit), a main storage unit 91 (a main storage unit), the auxiliary storage unit 92 (auxiliary storage unit), and the storage medium connection unit 13 are connected with a common bus. The operation of each unit is controlled by the main control unit 81 and the sub control unit 82. Note that the respective units may be connected via a bus control unit so-called "chipset", so as to be a plurality of hierarchies corresponding to a transmission speed of the signal. Alternatively, a memory controller may be built-in the main control unit 81 and the sub control unit 82 and to be connected to the main storage unit 91 directly.

The main control unit 81 is an information processing unit, such as a general-purpose CPU, a microcomputer and a microcontroller. The main control unit 81 executes a program read (loaded) in the main storage unit 91 to perform main control of the respective units for normal operation. The main control unit 81 is activated first when turning the power ON or recovering from a power-saving state.

The sub control unit 82 is also an information processing unit, such as a general-purpose CPU, a microcomputer and a microcontroller. The sub control unit 82 also executes a program loaded in the main storage unit 91 shared with the main control unit 81 to control the respective units when performing process to execute simultaneously with the main control unit 81 or performing power-saving operation. Activation and termination of the sub control unit 82 is controlled by the main control unit 81.

The main storage unit 91 is a storage unit such as a semiconductor memory including Dynamic Random Access Memory (DRAM), SRAM, and MRAM, and may be accessed faster than the auxiliary storage unit 92. The main storage unit 91 stores programs and data read from the auxiliary storage unit 92. In the example of FIG. 2, the main storage unit 91 is used as a shared main memory of the main control unit 81 and the sub control unit 82. Note that the main storage unit 91 may hold the content of the memory by a self-refresh function even during the power-saving state. The configuration of the program that is stored in the main control unit 81 during activation will be described later.

The auxiliary storage unit 92 is a storage unit such as a semiconductor memory including ROM (Read Only Memory) and flash memory, and HDD. The auxiliary storage unit 92 stores various programs and data. Among these, the semiconductor memory of the auxiliary storage unit 92 includes a nonvolatile memory, such as EEPROM, NAND type, and NOR type flash memory, MRAM, and ReRAM. Since the auxiliary storage unit 92 has a small number of access means to access to the stored memory, the speed (performance) of reading and writing deteriorates when being accessed from the main control unit 81 and the sub control unit 82 at the same time. In the auxiliary storage unit 92, Sequential Access, which sequentially accesses to the stored data, provides higher performance than Random Access, which separately refers to each of the stored data. As a result, the auxiliary storage unit 92 may speed up loading programs by configuring to access collectively either from the main control unit 81 or from the sub control unit 82 as much as possible. The configuration of the program of the auxiliary storage unit 92 read and written during activation will be described later. Note that the auxiliary storage unit 92 also stores job data or similar data for executing various jobs. The job data includes various files, such as image data obtained by reading a document using the document reading unit 2, a printing document data sent from a not illustrated Personal Computer (PC), and data received by facsimile.

The image processor 10 is an operation control unit, such as Digital Signal Processor (DSP) and Graphics Processing Unit (GPU). The image processor 10 performs specific image process on image data, for example, the image processor 10 performs image enhancement process, such as scaling, a density adjustment, and a gradation adjustment.

The network transmission/reception unit 12 is a network connection unit that includes a LAN broad to connect to network, a wireless transceiver, or a similar unit. With the network transmission/reception unit 12, a circuit for data communications transmits and receives data, and a voice telephone circuit transmits and receives speech signal.

Note that the image forming apparatus 1 may include a FAX transceiver unit to perform transmitting and receiving facsimile.

Function Configuration of the Image Forming Apparatus 1

Next, by referring to FIG. 3, a description will be given of a block that illustrates functions of the main control unit 81 and the sub control unit 82 of the image forming apparatus 1, and a configuration of programs and similar data stored in the main storage unit 91, the auxiliary storage unit 92, and the external storage medium 93 after the external storage medium 93 is activated while connected to the storage medium connection unit 13.

Figure 3:
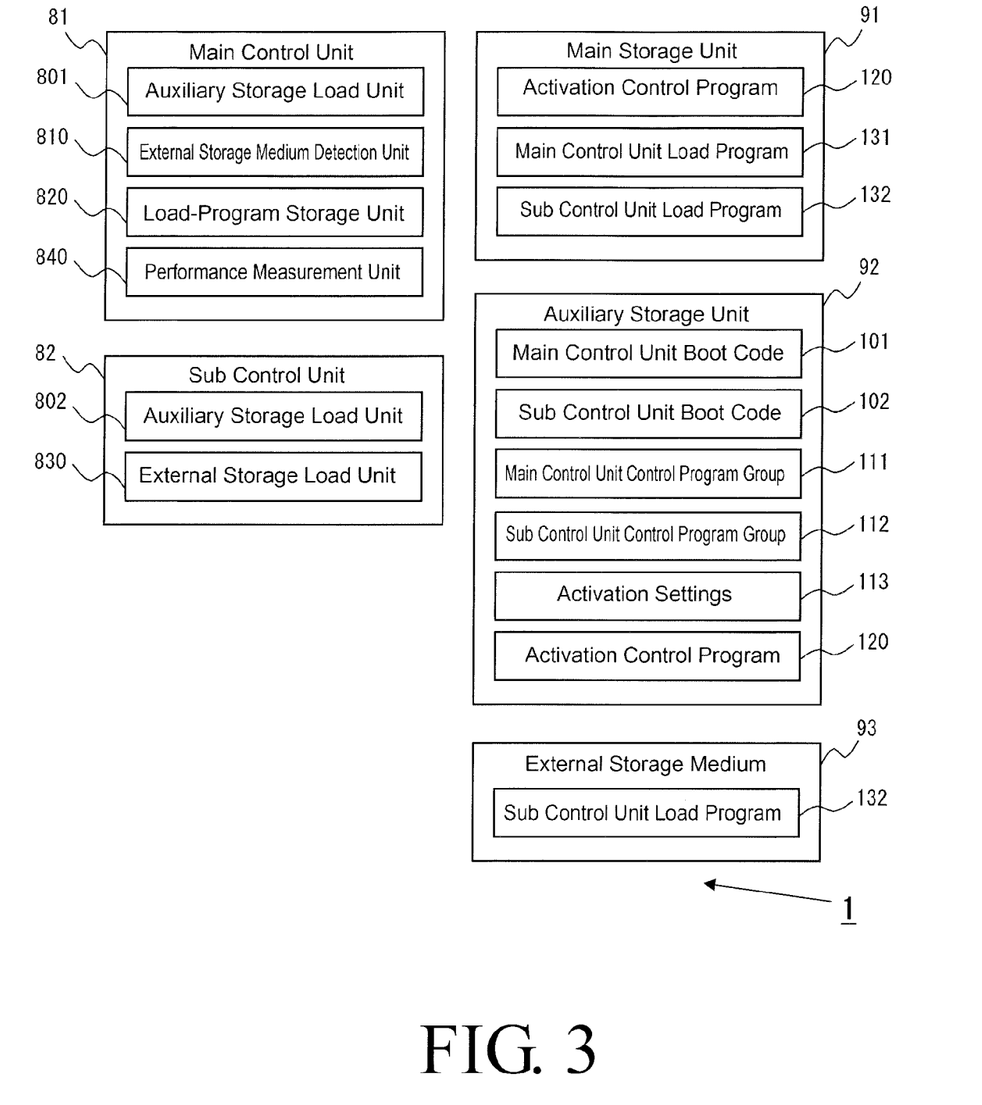
FIG. 3 is a schematic diagram illustrating a configuration of programs and data stored in a main storage unit, an auxiliary storage unit, and a storage medium of the image forming apparatus.

In the example of FIG. 3, the main control unit 81 includes an auxiliary storage load unit 801 (an auxiliary storage load unit), an external storage medium detection unit 810 (an external storage medium detection device), a load-program storage unit 820 (a load-program storage unit), and a performance measurement unit 840 (a performance measurement unit). The sub control unit 82 includes an auxiliary storage load unit 802 (an auxiliary storage load unit) and an external storage load unit 830 (an external storage load unit). After the activation, the main storage unit 91 stores an activation control program 120, a main control unit load program 131 (a main control unit load program), a sub control unit load program 132 (a sub control unit load program). The auxiliary storage unit 92 stores a main control unit boot code 101, a sub control unit boot code 102, a main control unit control program group 111 (a main control unit control program group), a sub control unit control program group 112 (a sub control unit control program group), activation settings 113, and an activation control program 120. The sub control unit load program 132 is copied from the main storage unit 91 and stored in the external storage medium 93.

The details of respective units are described below. Process from the activation of the main control unit 81 or the sub control unit 82 to the start of reading from the auxiliary storage unit 92 is called "an initial boot". Process that the main control unit 81 or the sub control unit 82 reads various programs including OS (Operating System) from the auxiliary storage unit 92 and enables at least some functions of the respective units of the image forming apparatus 1 is called "activation."

The auxiliary storage load unit 801 is a unit to load the main control unit control program group 111 stored in the auxiliary storage unit 92 to the main storage unit 91 at a normal activation or at a high-speed activation. The auxiliary storage load unit 802 is a unit to load the sub control unit control program group 112 to the main storage unit 91 at the first activation or when the external storage medium 93 is not connected. The auxiliary storage load unit 801 of the main control unit 81 loads any program in the main control unit control program group 111 from the auxiliary storage unit 92 to the main storage unit 91 at the first activation. The auxiliary storage load unit 802 of the sub control unit 82 then loads any program in the sub control unit control program group 112 to the main storage unit 91. In other words, the auxiliary storage load unit 801 and the auxiliary storage load unit 802 sequentially load the main control unit control program group 111 and the sub control unit control program group 112.

The external storage medium detection unit 810 detects that the external storage medium 93 is connected to the storage medium connection unit 13 of the image forming apparatus 1. When a plurality of the external storage media 93 are connected, the external storage medium detection unit 810 may detect that a plurality of these external storage media 93 are connected.

The load-program storage unit 820 causes the external storage medium 93 to store the sub control unit load program 132 when it is detected by the external storage medium detection unit 810 that the external storage medium 93 is connected. The load-program storage unit 820 stores the sub control unit load program 132 to the external storage medium 93 whose performance measured by the performance measurement unit 840 is higher than the specified value. At this point, if the plurality of the external storage media 93 are connected, it is recommended that the load-program storage unit 820 stores the sub control unit load program 132 to the external storage medium 93 whose performance measured by the performance measurement unit 840 is the highest. The example below describes a case where the load-program storage unit 820 causes the external storage medium 93 to store the sub control unit load program 132.

The external storage medium 93 is connected to the storage medium connection unit 13 during activation, and the sub control unit load program 132 is stored in the external storage medium 93. In this case, the external storage load unit 830 causes the main storage unit 91 to store the sub control unit load program 132 by reading it out from the external storage medium 93.

The performance measurement unit 840 measures a performance based on the reading speed of the external storage medium 93. The performance measurement unit 840 measures performance of the respective external storage media 93 when it is detected by the external storage medium detection unit 810 that the plurality of external storage media 93 are connected.

The main control unit boot code 101 is a program to initialize the main control unit 81 and the respective units related to the main control unit 81, such as an Initial Program Loader (IPL), which is executed during the activation of the main control unit 81, a boot loader, a Basic Input/Output System (BIOS), and firmware. The main control unit boot code 101 is stored in a NOR type flash memory or a similar memory, and may be configured to be executed by the main control unit 81 without being loaded to the main storage unit 91. The sub control unit boot code 102 is a program to initialize the sub control unit 82 and the respective units related to the sub control unit 82 in the same manner as the main control unit boot code 101.

The main control unit control program group 111, which is executed by the main control unit 81, includes various control programs and data group, such as OS, a device driver, application programs and database, to control the operation of the image forming apparatus 1. The sub control unit control program group 112, which is executed by the sub control unit 82, includes various control programs and data to control the operation of the image forming apparatus 1.

The activation settings 113 is data that includes the type of file, an order, and conditions of loading and execution included in the main control unit control program group 111 or the sub control unit control program group 112 loaded and executed by the main control unit 81 or the sub control unit 82 at the activation. In other words, the activation settings 113 includes information of the file selected from the main control unit control program group 111 at the activation and loaded as the main control unit load program 131. The activation settings 113 also includes information of the file selected from the sub control unit control program group 112 at the activation and loaded as the sub control unit load program 132. The activation settings 113 may include information of program and data that are minimally required at the activation, and of classification of programs and data sequentially loaded after the activation. The activation settings 113 may include information of classification of programs and data that are frequently used. In other words, with the activation settings 113, only programs and data that are minimally required or are frequently used during activation may be selected as the sub control unit control program group 112 in accordance with information of the classification. The activation settings 113 may include information of a system file information or partition. The activation settings 113 also includes instructions and settings of whether the sub control unit 82 performs high-speed activation or normal activation, information of the type and the partition of the external storage medium 93 which stores the sub control unit load program 132, and information which indicates that the main control unit 81 or the sub control unit 82 is in a state of activation. The activation settings 113 also includes the activation time when activating the main control unit 81 and the sub control unit 82, and performance data of the main storage unit 91, the auxiliary storage unit 92, and the external storage medium 93.

The activation control program 120 is a program executed after loaded to the main storage unit 91 by the main control unit 81 or the sub control unit 82 mainly after the execution of the main control unit boot code 101. The activation control program 120 includes programs to perform control process, such as activation of the main control unit 81, activation of the sub control unit 82, and storing of the sub control unit load program 132. Note that different activation control programs 120 may be prepared for the main control unit 81 and the sub control unit 82.

The main control unit load program 131 is a program and data that are selected from the main control unit control program group 111 by the main control unit 81 and loaded to the main storage unit 91 during activation. After loaded, the main control unit load program 131 is executed by the main control unit 81. The main control unit load program 131 is used when the main control unit 81 controls the respective units. The sub control unit load program 132 is a program and data that are loaded to the main storage unit 91 by the sub control unit 82 during activation. After loaded, the sub control unit load program 132 is executed by the sub control unit 82 and is used for controlling the respective units. The sub control unit load program 132 may include programs and data that are only minimally required during activation. The sub control unit load program 132 may include programs and data that are only frequently used.

As described above, the main control unit 81, the sub control unit 82, and the image processor 10 control the entire apparatus by reading the control programs stored in the auxiliary storage unit 92, and expanding the control programs to RAM. When the main control unit 81, the sub control unit 82, and the image processor 10 are expanded to the main storage unit 91 after the activation control program 120 is read from the auxiliary storage unit 92, executing these serves as the external storage medium detection unit, the load program storage unit, the load program reading unit, and the performance measurement unit.

Note that the main control unit 81 and the sub control unit 82 are equipped with a storage unit, such as flash memory or ROM, and may be configured to store the main control unit boot code 101 and the sub control unit boot code 102 to the flash memory or the ROM.

Activation Control Process by Image Forming Apparatus 1

Next, the activation control process of this embodiment is described by referring to FIG. 4 to FIG. 7. In the image forming apparatus 1 according to the embodiment of the disclosure, if the externally connected external storage medium 93, such as SD card and SSD, is separately provided even only one auxiliary storage unit 92, such as HDD, is present, this externally connected external storage medium 93 is used for high-speed activation. When it is determined that the external storage medium 93 is mounted, the image forming apparatus 1 copies the sub control unit load program 132, which is a program required for activation and other than the sub control unit boot code 102 of the sub control unit 82, to the external storage medium 93 during the first activation. From the next activation after the copying, it is possible to perform high-speed activation by reading the sub control unit load program 132 from the external storage medium 93 by the sub control unit 82 even during the activation of the main control unit 81. The activation control process of this embodiment is executed using hardware resources by the main control unit 81 and the sub control unit 82 based on programs and various settings stored mainly in the auxiliary storage unit 92 and the external storage medium 93. By referring to the flowchart illustrated in FIG. 4, the activation control process of this embodiment will be described below in details by each step.

Step S101

Figure 4:
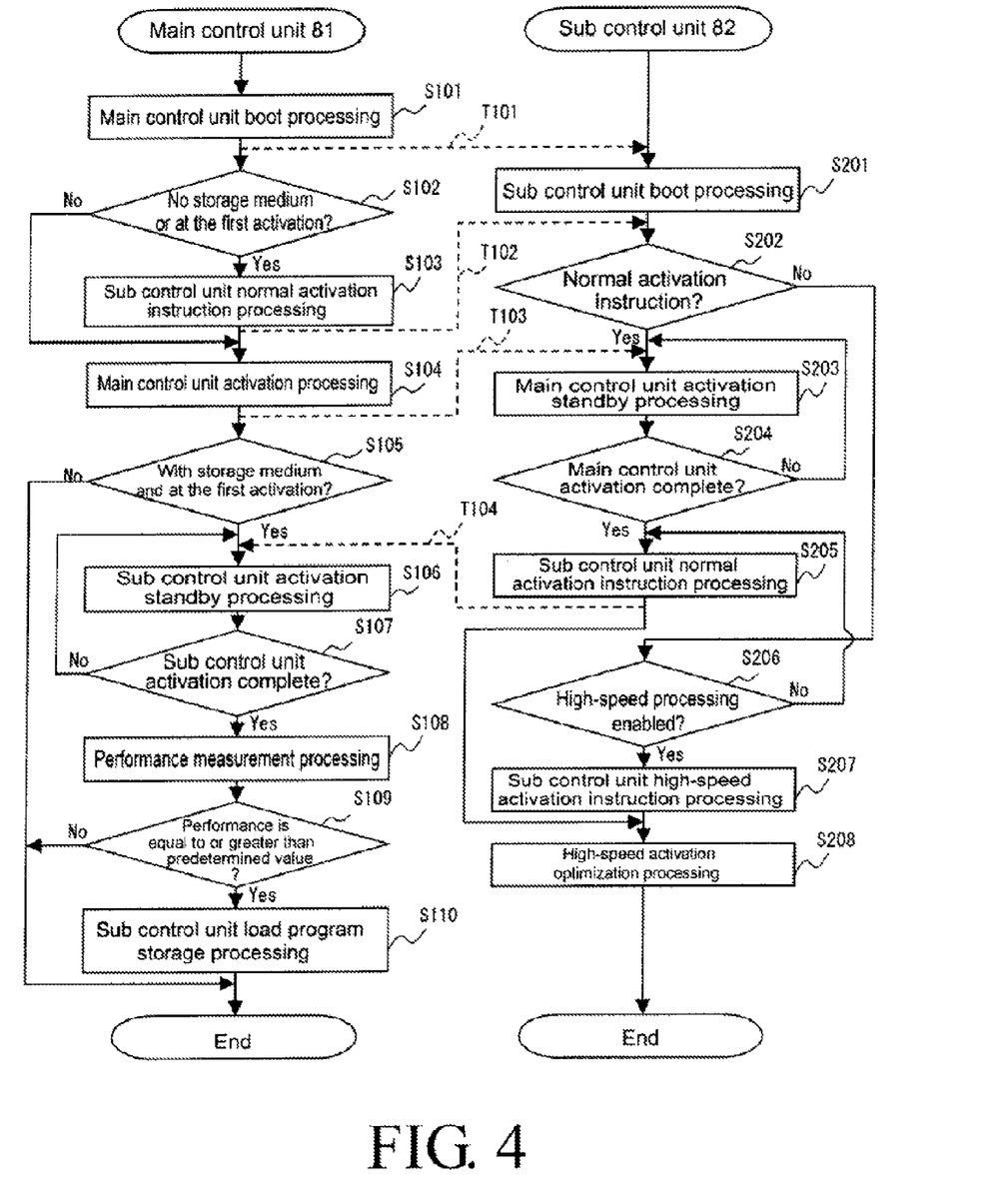
FIG. 4 is a flowchart of an activation control process according to the embodiment of the present disclosure.

The main control unit 81 performs the main control unit boot process. The main control unit 81 is activated during the power source activation or when recovering from power-saving state. The activated main control unit 81 executes the main control unit boot code 101 of the auxiliary storage unit 92 to perform initial boot. This causes the main control unit 81 to perform self-initialization similar to the microcode initialization of the main control unit 81 itself or similar, and initialization of the respective units connected to the bus. The main control unit 81 also transmits activation signal that activates the sub control unit 82 (timing T101).

Step S201

The sub control unit 82 that received the activation signal from the main control unit 81 performs the sub control unit boot process in this step. When the sub control unit 82 is activated, the sub control unit 82 executes the sub control unit boot code 102 of the auxiliary storage unit 92 to perform the initial boot, and performs initialization of the sub control unit 82 itself and initialization of the respective units.

Step S102

The main control unit 81 determines whether the external storage medium 93 is connected or not by the external storage medium detection unit 810, or whether this activation was the first activation or not. First, the main control unit 81 loads the activation control program 120 to the main storage unit 91 from the auxiliary storage unit 92 to execute. The main control unit 81 detects whether the external storage medium 93 is connected to the storage medium connection unit 13 or not. If the external storage medium 93 is not connected, the main control unit 81 determines it as "Yes." If the main control unit 81 is to be activated for the first time since high-speed activation is set, in other words, if it is the first activation, the main control unit 81 also determines it as "Yes." By referring to the activation settings 113 of the auxiliary storage unit 92, if the sub control unit control program group 112 to be loaded at least at the activation is updated, the main control unit 81 considers it as the first activation and determines it as "Yes." Otherwise, the main control unit 81 determines it as "No." If the determination is Yes, the main control unit 81 proceeds the process to the step S103 in order to activate the sub control unit 82 normally. If the determination is "No", the main control unit 81 proceeds the process to the step S104 in order not to activate the sub control unit 82 normally.

Step S103

When activating the sub control unit 82 normally, the main control unit 81 performs a sub control unit normal activation instruction process by the auxiliary storage load unit 801. The main control unit 81 instructs the sub control unit 82 to load necessary programs for activating the sub control unit control program group 112 from the auxiliary storage unit 92 to activate. For instance, the main control unit 81 writes settings to normally activate the sub control unit 82 to the activation settings 113 (timing T102). Note that the main control unit 81 may be set to suspend until this instruction is given after the initial boot of the sub control unit 82.

Step S202

After the initial boot, the sub control unit 82 executes the activation control program 120 loaded to the main storage unit 91. The sub control unit 82 determines whether the instruction has been given by the auxiliary storage load unit 802 to activate normally from the main control unit 81. If the instruction to activate normally was given by the main control unit 81, the sub control unit 82 determines it as "Yes." For instance, if a setting to instruct the normal activation was described in the activation settings 113, the sub control unit 82 determines it as "Yes." Otherwise, the sub control unit 82 determines it as "No." Note that it is also possible for the sub control unit 82 to determine whether the main control unit 81 is in activation state or not by referring to the access condition of the auxiliary storage unit 92. If the determination is "Yes," the sub control unit 82 proceeds the process to the step S203 in order to activate normally. If the determination is "No", the sub control unit 82 proceeds the process to the step S206 to determine whether the high-speed activation is possible or not.

Step S203

If the instruction is given to perform the normal activation, the sub control unit 82 performs the main control unit activation standby process by the auxiliary storage load unit 802. If the main control unit 81 and the sub control unit 82 access to the auxiliary storage unit 92 at the same time as described above, the reading performance decreases. Thus, the sub control unit 82 waits until the main control unit 81 completes the activation.

Step S204

Next, the sub control unit 82 determines whether the main control unit 81 has completed activation by the auxiliary storage load unit 802 or not. If a notification that the activation of the main control unit 81 is complete has not been issued or the specified time has not passed, the sub control unit 82 determines that the main control unit 81 is in the activation state, and determines it as "Yes." Otherwise the sub control unit 82 determines that the activation of the main control unit 81 is complete and determines it as "No." If the determination is "Yes," the sub control unit 82 proceeds the process to the step S205. If the determination is "No," the sub control unit 82 returns the process to the step S203 and continues standby.

Step S104

Figure 5A:
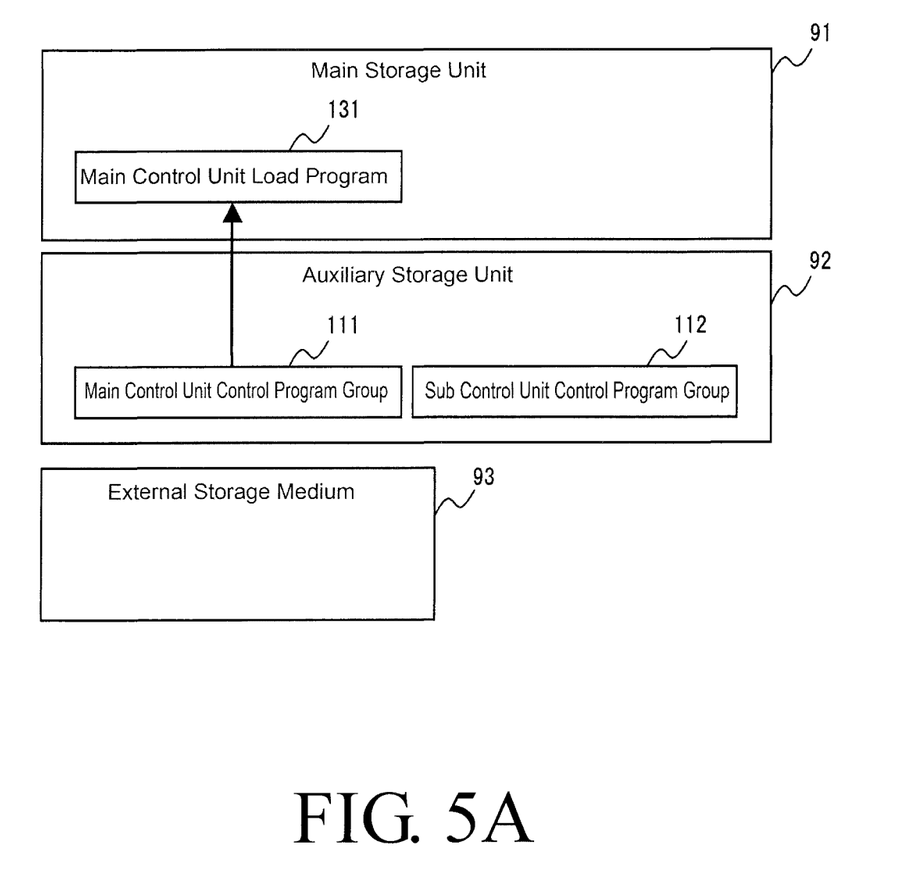
FIG. 5A is a schematic diagram illustrating a main control unit activation process according to the embodiment of the present disclosure.
Figure 5B:
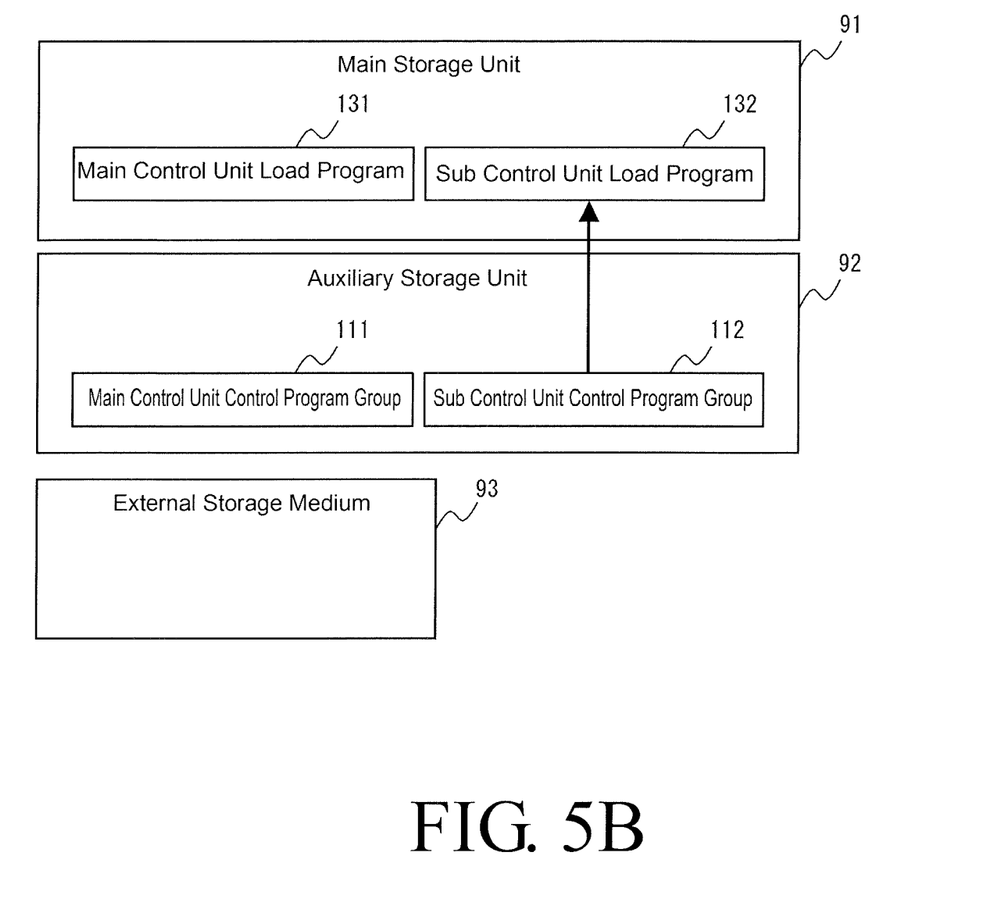
FIG. 5B is a schematic diagram illustrating a sub control unit activation process according to the embodiment of the present disclosure.

Meanwhile, the main control unit 81 performs an actual main control unit activation process by the auxiliary storage load unit 801. Referring to FIG. 5A, the main control unit 81 selects files of necessary programs and data for activation from the main control unit control program group 111 in accordance with the activation setting 113. The main control unit 81 loads the selected files from the main control unit control program group 111 to the main storage unit 91. The loaded programs and data become the main control unit load program 131. The main control unit 81 notifies the sub control unit 82 that the activation is complete (timing T103). At this point, the main control unit 81 writes the activation time of the main control unit 81 to the activation settings 113.

Step S105

After completing the activation, the main control unit 81 determines whether or not the external storage medium 93 is connected and this activation was the first activation, by the load-program storage unit 820. If the external storage medium 93 is connected to the storage medium connection unit 13 and it was the first activation, the main control unit 81 determines it as "Yes." Otherwise the main control unit 81 determines it as "No." If the determination is "Yes," the main control unit 81 proceeds the process to the step S106 to store the sub control unit load program 132 to the external storage medium 93. If the determination is "No," the main control unit 81 terminates the process of the main control unit 81 of the activation control process, and enters into an operable state.

Step S205

Meanwhile, when the main control unit 81 completes the activation, if a normal activation is instructed, the sub control unit 82 performs a sub control unit activation process by the auxiliary storage load unit 802. According to FIG. 5B, the sub control unit 82 loads necessary programs and data to the main storage unit 91 from the sub control unit control program group 112 by referring to the activation setting 113. The loaded programs and data become the sub control unit load program 132. At this point, the sub control unit 82 may load only minimum required programs and data from the sub control unit control program group 112 during activation. The sub control unit 82 notifies the main control unit 81 after completing the activation (timing T104). At this point, the sub control unit 82 writes the activation time of the sub control unit 82 to the activation settings 113. After that, the sub control unit 82 proceeds the process to the step S208.

Step S106

When storing the sub control unit load program 132 to the external storage medium 93, the main control unit 81 performs a sub control unit activation standby process by the load-program storage unit 820. The main control unit 81 waits until the sub control unit load program 132 loaded from the sub control unit control program group 112 is created in the main storage unit 91 after completing the normal activation of the sub control unit 82.

Step S107

Next, the main control unit 81 determines whether or not the sub control unit 82 has completed activation by the load-program storage unit 820. If the main control unit 81 receives the notification of completion of activation from the sub control unit 82, the main control unit 81 determines it as "Yes." Otherwise the main control unit 81 determines it as "No." If the determination is "Yes," the main control unit 81 proceeds the process to the step S108. If the determination is "No," the main control unit 81 returns the process to the step S106 and continues standby.

Step S108

If the activation of the sub control unit 82 completes at this step, the main control unit 81 performs the performance measurement process by the performance measurement unit 840. The main control unit 81 measures mainly the reading speed of the external storage medium 93 connected to the storage medium connection unit 13 as the performance. For example, the main control unit 81 writes a specific size of random numerical value data to the external storage medium 93. The average speed value read by a sequential access is calculated as the performance value. The main control unit 81 also calculates a difference in performance depending on a position of the partition of the external storage medium 93; in other words, a difference between inside and outside of a disk, such as a HDD. This enables the main control unit 81 to calculate the value similar to the performance value when actually reading the sub control unit load program 132. The main control unit 81 measures respective reading performances of the external storage media 93 when it is detected that a plurality of external storage media 93 are connected to the storage medium connection unit 13.

Step S109

The main control unit 81 determines whether the performance of the external storage medium 93 measured by the performance measurement unit 840 is higher than the specified value. If at least one of the performances of the external storage medium 93 is higher than the specified value, the main control unit 81 determines it as "Yes." Otherwise, in other words, if performances of all the external storage medium 93 are less than the specified value, the main control unit 81 determines it as "No." Note that, the main control unit 81 may calculate the specified value in accordance with the total value of the activation times of the main control unit 81 and that of the sub control unit 82 from the activation settings 113. If the determination is "Yes," the main control unit 81 proceeds the process to the step S110. If the determination is "No," the main control unit 81 terminates the process of the main control unit 81 in the activation control process, and enters into an operable state. In this case, the main control unit 81 changes the settings of the activation settings 113 so as not to perform high-speed activation.

Step S110

Figure 6:
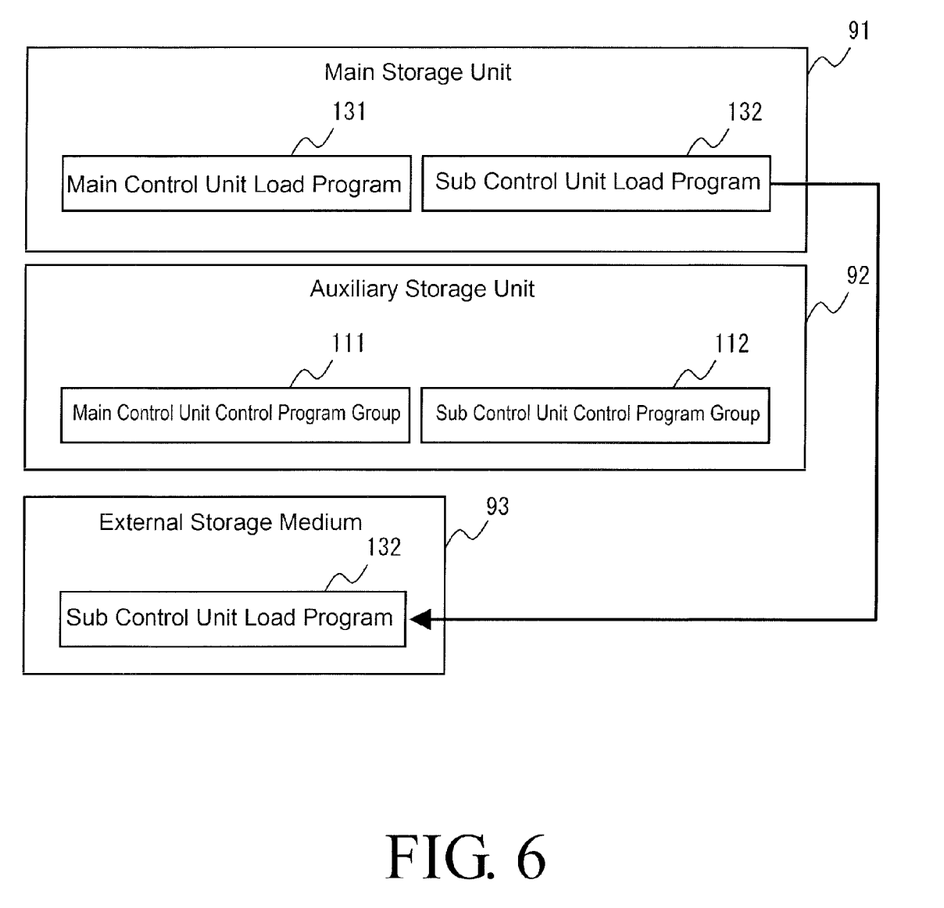
FIG. 6 is a schematic diagram illustrating a sub control unit load program storage process according to the embodiment of the present disclosure.

If the external storage medium 93 whose measured performance is higher than the specified value is present, the main control unit 81 performs the sub control unit load program storage process by the load-program storage unit 820. Referring to FIG. 6, the main control unit 81 stores the sub control unit load program 132 to the external storage medium 93 whose measured performance is higher than the specified value. Here, the main control unit 81 may select the highest performance external storage medium 93, if a plurality of external storage media 93 whose performance are higher than the specified value are connected. On this occasion, the main control unit 81 may store the sub control unit load program 132 to the partition having the highest performance. The process of the main control unit 81 of the activation control process according to the embodiment completes. Then, the main control unit 81 enters into an operable state that performs process in accordance with the specified instruction information input from the operation panel unit 6 or an external terminal. On this occasion, the main control unit 81 may sequentially load necessary programs of the main control unit control program group 111 to the main storage unit 91 to execute.

Step S206

Again, the process of the sub control unit 82 will be described. If it is not the first activation or no instruction to perform the normal activation is given, the sub control unit 82 determines whether or not the high-speed activation is possible by the external storage load unit 830. The sub control unit 82 refers to the activation settings 113. If the activation settings 113 is set to perform the high-speed activation, the external storage medium 93 for the high-speed activation is connected to the external storage medium connection unit 13, and the sub control unit load program 132 is stored in the external storage medium 93, the sub control unit 82 determines it as "Yes." Otherwise the sub control unit 82 determines it as "No." If the determination is "Yes," the sub control unit 82 proceeds the process to the step S207. If the determination is "No," the sub control unit 82 returns the process to the step S205 and performs the normal activation.

Step S207

Figure 7:
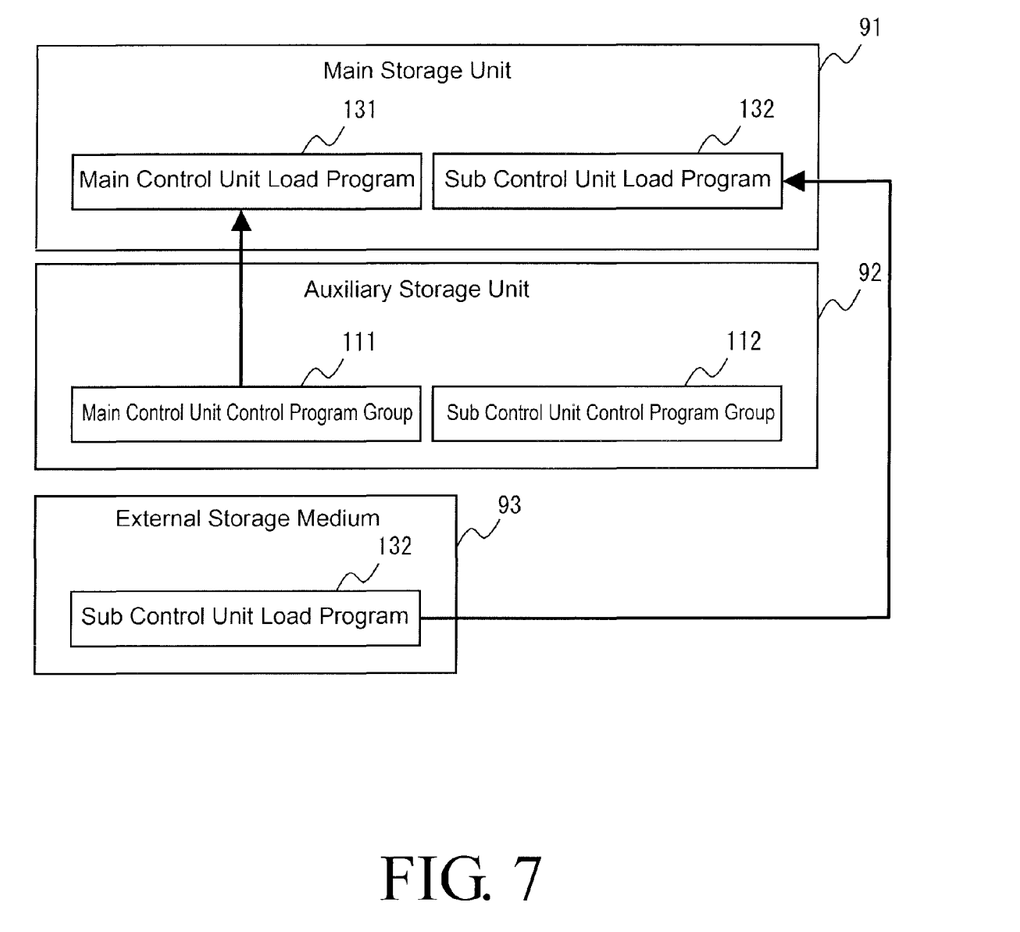
FIG. 7 is a schematic diagram illustrating a sub control unit high-speed activation process according to the embodiment of the present disclosure.

If the high-speed activation is possible, the sub control unit 82 performs the sub control unit high-speed activation process by the external storage load unit 830. Referring to FIG. 7, the sub control unit 82 loads the sub control unit load program 132 from the external storage medium 93 for the high-speed activation connected to the external storage medium connection unit 13 to expand it on the main storage unit 91. On this occasion, it is possible to load the sub control unit load program 132 of the sub control unit 82 in parallel while the main control unit 81 is loading the main control unit control program group 111 from the auxiliary storage unit 92. This eliminates the need for respective accessing the auxiliary storage unit 92 from the main control unit 81 and the sub control unit 82 and shortens the activation time to enable the high-speed activation. Then, by referring to the activation settings 113, the sub control unit 82 sequentially loads other necessary files from the sub control unit control program group 112 if the sub control unit load program 132 only includes minimally required programs and data for activation or includes frequently used programs and data only. At this point, by referring to the access state of the auxiliary storage unit 92 by the main control unit 81, the sub control unit 82 may load the files while access is free.

Step S208

At this step, the sub control unit 82 performs a high-speed activation optimal process by the external storage load unit 830. The sub control unit 82 enters into an operable state after loading the sub control unit load program 132, and controls respective units together with the main control unit 81 in accordance with instructions from a user. The sub control unit 82 sequentially loads necessary programs of the sub control unit control program group 112 to the main storage unit 91 to execute. After the activation, the sub control unit 82 analyzes functions to be used according to function usage history by users, and works out the minimally required programs and data for activation and programs and data that are frequently used. As a result, the sub control unit 82 may change the classification of the activation settings 113. The sub control unit 82 may also shorten the activation time by optimizing the order of files that are loaded by the activation settings 113. The sub control unit 82 may also change the activation settings 113 to preferentially load files related to initialization of a user host interface such as Graphical User Interface (GUI). The sub control unit 82 may also reflect the optimized order of files to load to the sub control unit load program 132 stored in the external storage medium 93. Accordingly, a loading speed of programs and data related to frequently used functions can be increased, and respective functions of the image forming apparatus 1 can be operated without keeping users waiting. Thus, the process of the sub control unit 82 of the activation control process according to the embodiment completes.

This configuration can provide the following effects. The image forming apparatus 1 of the disclosure includes the main control unit 81 and the sub control unit 82, and the main storage unit 91 and the auxiliary storage unit 92, which are connected to the main control unit 81 and the sub control unit 82. The main control unit 81 includes the external storage medium detection unit 810 and the load-program storage unit 820. The sub control unit 82 includes the external storage load unit 830. The external storage medium detection unit 810 detects that the external storage medium 93 is connected to the image forming apparatus 1. The load-program storage unit 820 stores the sub control unit load program 132 to be loaded to the main storage unit 91 from the auxiliary storage unit 92 by the sub control unit 82 during the activation into the external storage medium 93 when the external storage medium detection unit 810 detects that the external storage medium 93 is connected. The external storage load unit 830 reads the sub control unit load program 132 from the external storage medium 93 and stores it in the main storage unit 91 when the external storage medium 93 is connected and the sub control unit load program 132 is stored in the external storage medium 93 during activation. Thus, a delay in activation time caused by overlapped loading of the programs stored in the auxiliary storage unit 92 at activation is minimized, thus ensuring a high-speed activation. Accordingly, it is possible to obtain an effect that users can be provided with the functions of the image forming apparatus 1 more quickly than ever.

In contrast, a comparative image forming apparatus often includes only one auxiliary storage unit, such as HDD and flash memory, to reduce costs even with a plurality of control units. The auxiliary storage unit cannot normally be accessed at the same time. Even if the auxiliary storage unit can be accessed, a performance of an operation, such as reading and writing, deteriorates. With the comparative image forming apparatus, the respective plurality of control units need load programs and similar in turns when the access to the auxiliary storage unit is concentrated during such as activation. In other words, the comparative image forming apparatus is configured to intensively access to the auxiliary storage unit by one control unit while making other control unit wait to access to the auxiliary storage unit. As a result, there is a problem that it takes long time for the activation.

With the comparative image forming apparatus, if the auxiliary storage unit is a storage unit where only one access unit is simultaneously accessible to one device, such as an embedded flash memory, the auxiliary device sometimes has to wait to be accessed while the main control unit is accessing to the auxiliary storage unit. In other words, a delay in completion of activation of the sub control unit device caused the delay in activation. Whereas, the image forming apparatus 1 of the disclosure may decrease the activation time without the sub control unit 82 having to wait even if the auxiliary storage unit 92 is a flash memory.

The main control unit 81 or the sub control unit 82 of the image forming apparatus 1 of the disclosure includes the performance measurement unit 840, which measures performance such as a reading speed of the external storage medium 93. In the image forming apparatus 1, the load-program storage unit 820 stores the sub control unit load program 132 into the external storage medium 93 whose measured performance is higher than a specified value. This ensures that the time to load the sub control unit load program 132 from the external storage medium 93 is shortened compared with the normal activation from the auxiliary storage unit 92. This ensures that the image forming apparatus 1 may be activated in a short time compared with reading the main control unit load program 131 and the sub control unit load program 132 in sequence.

With the main control unit 81 or the sub control unit 82 of the image forming apparatus 1 of the disclosure, if the external storage medium detection unit 810 detects that a plurality of external storage media 93 are connected, the performance measurement unit 840 measures respective performances of the plurality of external storage media 93. As a result, the load-program storage unit 820 stores the sub control unit load program 132 into the external storage medium 93 with the highest performance. As a result, preferentially storing the sub control unit load program 132 into a high-performance external storage medium 93 can shorten the activation time.

Other Embodiments

Figure 8:
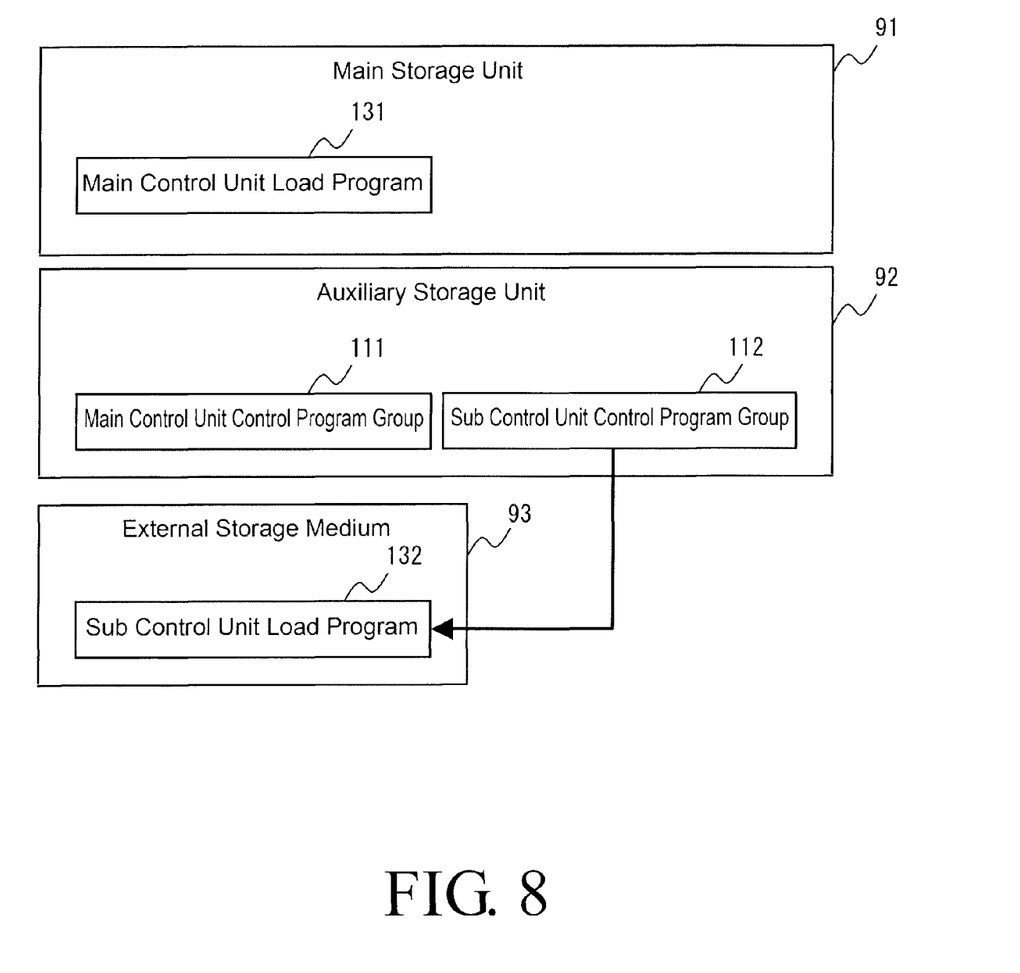
FIG. 8 is a schematic diagram illustrating a sub control unit load program storage process according to another embodiment of the present disclosure.

In the above-described embodiments, the main control unit 81 is configured to store the sub control unit load program 132, which is stored in the main storage unit 91, into the external storage medium 93. However, the image forming apparatus 1 may create the sub control unit load program 132 directly from the sub control unit control program group 112 stored in the auxiliary storage unit 92 by the load-program storage unit 820, and may store it into the connected external storage medium 93. According to the example in FIG. 8, the main control unit 81 selects programs and data necessary for activation directly from the sub control unit control program group 112 by referring to the activation settings 113 by the load-program storage unit 820 to create the sub control unit load program 132, and stores it into the external storage medium 93. The main control unit 81 may create a memory image of programs and data to be executed by the sub control unit 82 stored in the main storage unit 91, and store it as the sub control unit load program 132 in the external storage medium 93. The sub control unit load program 132 may be compressed or be encrypted. Storing and reading of the sub control unit load program 132 may be performed by Direct Memory Access (DMA).

The sub control unit load program 132 may be stored in the external storage medium 93 by the sub control unit 82. The sub control unit load program 132 may be loaded in the main storage unit 91 by the main control unit 81. It may be configured to store the main control unit load program 131 into the external storage medium 93 and to be loaded by the main control unit 81 or the sub control unit 82 during activation.

In the above-described embodiment, the main control unit 81 and the sub control unit 82 may be integrally configured similarly to a multi-core CPU or a single-package CPU. The main control unit 81 and the sub control unit 82 may be each configured from a plurality of equal to or more than two CPU cores. The main control unit 81 may have a CPU core whose power consumption and throughput are relatively large, while the sub control unit 82 may have a CPU core whose power consumption is relatively low. While in the above-described embodiment it is described to use physically separate control units; it is also applicable to a control unit having a plurality of logical CPU cores where even one physical core can simultaneously execute multiple threads, such as hyper-threading. This embodiment is also applicable to a configuration where a plurality of processes and thread processes are switched.

The main control unit 81, the sub control unit 82, and the image processor 10 may be integrally formed like a CPU with built-in memory, a CPU with built-in GPU, and a tip on Module. In other words, the main control unit 81, the sub control unit 82, and the image processor 10 may be configured to include some of or all of the main storage unit 91 and/or the auxiliary storage unit 92. While the main control unit 81 and the sub control unit 82 share the main storage unit 91 and the auxiliary storage unit 92, this should not be construed in a limiting sense. For example, the main control unit 81 and the sub control unit 82 may be configured to have a separate main storage units and connected by, for example, a bus arbiter. Alternatively, the external storage medium 93 may be configured to connect to the sub control unit 82 only and to be accessed from the sub control unit 82 only. With this configuration, it is possible to suppress the deterioration in performance caused by sharing the bus.

The activation control process according to the embodiment of the disclosure is not limited to the image forming apparatus, and may be applied to an information processing unit including a control unit such as a plurality of CPUs, for example PCs, smartphones, mobile phones, office devices and industrial devices.

The above-described configurations and operations of embodiments are examples and these may be changed without departing from the scope of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   a main control unit;
   a sub control unit;
   a main storage unit;
   an auxiliary storage unit;
   an auxiliary storage load unit configured to load each program to be executed by the main control unit and each program to be executed by the sub control unit from the auxiliary storage unit to the main storage unit at first activation;
   a load-program storage unit configured to store a program to be executed by the sub control unit stored in a specified storage unit to an external storage medium connected to the image forming apparatus; and
   an external storage load unit configured to load the program stored in the external storage medium by the load-program storage unit to the main storage unit at a subsequent activation concurrently with loading the program to be executed by the main control unit from the auxiliary storage unit by the auxiliary storage load unit.

2. The image forming apparatus according to claim 1, wherein
   the specified storage unit includes the main storage unit, and
   the program to be executed by the sub control unit includes a program loaded to the main storage unit by the auxiliary storage load unit.

3. The image forming apparatus according to claim 1, wherein the specified storage unit includes the auxiliary storage unit.

4. The image forming apparatus according to claim 1, further comprising
   a performance measurement unit configured to measure a performance based on a reading speed of the external storage medium, wherein
   the load-program storage unit stores the program to be executed by the sub control unit in the external storage medium if the performance measured by the performance measurement unit is higher than a specified value.

5. The image forming apparatus according to claim 4, wherein
   if a plurality of the external storage medias are connected, the performance measurement unit measures a performance of each of the external storage medias, and
   the load-program storage unit stores the program to be executed by the sub control unit in the external storage medium with a highest performance measured by the performance measurement unit.

6. An activation control method for an image forming apparatus including a main control unit, a sub control unit, a main storage unit, and an auxiliary storage unit, comprising:
   loading each program to be executed by the main control unit and each program to be executed by the sub control unit from the auxiliary storage unit to the main storage unit at first activation;
   storing a program to be executed by the sub control unit stored in a specified storage unit to an external storage medium connected to the image forming apparatus; and
   loading the program stored in the external storage medium by the load-program storage unit to the main storage unit at a subsequent activation concurrently with loading the program to be executed by the main control unit from the auxiliary storage unit by the auxiliary storage load unit.

7. The activation control method according to claim 6, wherein
   the specified storage unit includes the main storage unit, and
   the program to be executed by the sub control unit includes a program loaded to the main storage unit by the auxiliary storage load unit.

8. The activation control method according to claim 6, wherein the specified storage unit includes the auxiliary storage unit.

9. The activation control method according to claim 6, further comprising measuring a performance based on a reading speed of the external storage medium; and storing the program to be executed by the sub control unit in the external storage medium if the performance measured by the performance measurement unit is higher than a specified value.

10. The activation control method according to claim 9, further comprising storing, if a plurality of the external storage medias are connected, the performance measurement unit measures a performance of each of the external storage medias, the program to be executed by the sub control unit in the external storage medium with a highest performance measured by the performance measurement unit.

11. A non-transitory computer-readable recording medium storing an activation control program executable by an image forming apparatus including a main control unit, a sub control unit, a main storage unit, and an auxiliary storage unit, the activation control program causing the image forming apparatus to function as:

an auxiliary storage load unit configured to load each program to be executed by the main control unit and each program to be executed by the sub control unit from the auxiliary storage unit to the main storage unit at first activation;

a load-program storage unit configured to store a program to be executed by the sub control unit stored in a specified storage unit to an external storage medium connected to the image forming apparatus; and an external storage load unit configured to load the program stored in the external storage medium by the load-program storage unit to the main storage unit at a subsequent activation concurrently with loading the program to be executed by the main control unit from the auxiliary storage unit by the auxiliary storage load unit.

12. The non-transitory computer-readable recording medium according to claim 11, wherein the specified storage unit includes the main storage unit, and the program to be executed by the sub control unit includes a program loaded to the main storage unit by the auxiliary storage load unit.

13. The non-transitory computer-readable recording medium according to claim 11, wherein the specified storage unit includes the auxiliary storage unit.

14. The non-transitory computer-readable recording medium according to claim 11, the activation control program further causing the image forming apparatus to function as a performance measurement unit configured to measure a performance based on a reading speed of the external storage medium, wherein the load-program storage unit stores the program to be executed by the sub control unit in the external storage medium if the performance measured by the performance measurement unit is higher than a specified value.

15. The non-transitory computer-readable recording medium according to claim 14, wherein if a plurality of the external storage medias are connected, the performance measurement unit measures a performance of each of the external storage medias, and the load-program storage unit stores the program to be executed by the sub control unit in the external storage medium with a highest performance measured by the performance measurement unit.

* * * * *